(12) United States Patent
Coombes (10) Patent No.: US 8,960,379 B2
(45) Date of Patent: Feb. 24, 2015

(54) SUPPLEMENTAL MECHANISM FOR ACTUATING THE BRAKE OF A BICYCLE AND METHODS OF USE

(71) Applicant: Roger Walter Coombes, Los Altos, CA (US)

(72) Inventor: Roger Walter Coombes, Los Altos, CA (US)

( * ) Notice: Subject to any disclaimer, the term of this patent is extended or adjusted under 35 U.S.C. 154(b) by 50 days.

(21) Appl. No.: 13/888,114

(22) Filed: May 6, 2013

(65) Prior Publication Data

US 2013/0292213 A1    Nov. 7, 2013

Related U.S. Application Data

(60) Provisional application No. 61/643,778, filed on May 7, 2012.

(51) Int. Cl.
*B62L 3/02* (2006.01)
*B62L 3/04* (2006.01)
*B62L 1/16* (2006.01)

(52) U.S. Cl.
CPC ... *B62L 3/04* (2013.01); *B62L 1/16* (2013.01); *B62L 3/02* (2013.01)
USPC ..................................... 188/24.22; 188/24.11

(58) Field of Classification Search
CPC .............. B62L 1/04; B62L 1/06; B62L 3/02; B62L 3/04; G05G 1/52
USPC ............ 188/2 D, 24.11, 24.12, 24.22, 25, 27; 74/515 R
See application file for complete search history.

(56) References Cited

U.S. PATENT DOCUMENTS

| 514,819 | A | * | 2/1894 | Erskine | 188/27 |
| 619,395 | A | * | 2/1899 | Crossley | 188/24.11 |
| 717,900 | A | * | 1/1903 | McElfresh | 188/25 |
| 2,631,693 | A | * | 3/1953 | Konsberg | 188/24.11 |
| 5,094,322 | A | * | 3/1992 | Casillas | 188/24.22 |
| 7,107,139 | B2 | * | 9/2006 | Ali | 74/515 R |
| 7,458,443 | B2 | * | 12/2008 | Givonetti | 188/24.11 |

FOREIGN PATENT DOCUMENTS

| FR | 735333 A | * | 11/1932 |
| GB | 1901 23349 A | * | 0/1902 |
| GB | 276507 A | * | 9/1927 |

OTHER PUBLICATIONS

EPO Machine Translation, FR 735,333 A, Nov. 1932, Masse.*

* cited by examiner

*Primary Examiner* — Thomas J Williams
(74) *Attorney, Agent, or Firm* — Workman Nydegger; Paul N Taylor (57) ABSTRACT

The present invention describes a supplemental mechanism for actuating the brake of a bicycle either independently or as an addition to normal hand operation of the brake by a brake lever on the handlebars. The actuating mechanism can be adapted to operate a variety of manufactured rim, disc or hub brakes and brake operating mechanisms, including but not limited to Bowden cables and hydraulic actuators and to a variety of different bicycle configurations including but not limited to tandems, (which here is used to describe any kind of multi-seat bicycle), recumbent bicycles and tricycles.

1 Claim, 11 Drawing Sheets

SUPPLEMENTAL MECHANISM FOR ACTUATING THE BRAKE OF A BICYCLE AND METHODS OF USE

CROSS-REFERENCE TO RELATED APPLICATIONS

The present application claims the benefit of and priority to U.S. Provisional Patent Application Ser. No. 61/643,778, filed on May 7, 2012, the entirety of which is incorporated herein by reference.

BACKGROUND OF THE DISCLOSURE

1. The Field of the Invention

The present application relates to the field of mechanisms for actuating the brake of a bicycle and methods of use. More particularly, the present invention relates to methods, machines, systems, sub-systems, assemblies, and components for providing supplemental mechanisms for actuating the brake of a bicycle and methods of use.

2. The Relevant Technology

Most bicycles today use hand brakes or a coaster brake. Most cyclists prefer bikes with hand brakes.

As cyclists age or become injured, it may become difficult or impossible to actuate a front hand brake. For example, cyclists may have difficulty because of age, disease, or injury. Normal hand brake operation may be impossible where a cyclist has lost the use of a hand through, for example, amputation, neurological, or other issues.

Therefore, a need exists for a supplemental mechanism for actuating the brake of a bicycle.

BRIEF SUMMARY OF THE INVENTION

It should be noted that the embodiments disclosed herein do not constitute an exhaustive summary of all possible embodiments, nor does this brief summary constitute an exhaustive list of all aspects of any particular embodiment(s). Rather, this brief summary simply presents selected aspects of some example embodiments. It should be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular technical effect(s) or solution(s).

Disclosed embodiments are generally concerned with supplemental mechanisms for actuating the brake of a bicycle either independently or as an addition to normal hand operation of the brake by a brake lever on the handlebars. Embodiments within the scope of this disclosure may include aspects of the present disclosure together with any one or more of the following elements, and features of elements, in any combination:

One example embodiment of the present invention provides for a pivot point mounted to the bicycle frame near the intersection of the left-hand (non-drive side) chain stay and seat stay and an anchor point mounted above it on the seat stay, these items may be welded, brazed, clamped or glued to the existing bicycle frame. The anchor point provides for mounting a cable housing stop, hydraulic cylinder, or electrical actuator control.

The pivot point is arranged such that it supports near the rear end, and permits the rotation downwards of an actuator positioned above and approximately parallel to the chain stay. The left which is typically the non-drive side is chosen as there would be no interference with the chain and crank arm system.

The distal end of the actuator is widened and is positioned such that during the upward stroke of normal pedaling, the shoe of the rider passes close to the side of the distal end of actuator but does not touch it. To operate the actuator, pedaling is stopped, the foot is rotated slightly inward on the pedal and the heel of the shoe is pressed down on the actuator. Most modern 'clip-less' pedals provide sufficient rotation of the foot to operate the actuator while the shoe is still engaged in the pedal. In the unusual case of zero rotation pedal clips it will be necessary to temporarily unclip the shoe from its retainer on the pedal but since the foot is only slightly rotated and not displaced it is always in position to be readily clipped in again. Applying pressure to the actuator can be accomplished by tipping the foot by rotating the ankle and generally it will not be necessary to rotate the pedals in the reverse direction.

In another embodiment, the actuator can operate a variety of actuating mechanisms including but not limited to a Bowden cable, the piston of a hydraulic master cylinder, an electronic controller, or in the case of a bicycle using an Aerodynamic handlebar system a single inner cable, and thus operate the existing brake system of the bicycle.

Although they are not that common, the invention can be utilized with hydraulic rim brakes. In this system, the brake arms are mounted either on the same pivot points used for cantilever and linear-pull brakes but move in a lateral motion toward the rim when the hand lever and/or foot lever are applied. Hydraulic brakes use the motion of the brake levers to push fluid from a reservoir, usually the master cylinder, through a set of lines or hoses to move pistons in the brake calipers, thus forcing pads against a braking surface. However today, most of the bicycle hydraulic actuation mechanisms are identified mostly with disc brakes.

A disc brake consists of a metal disc attached to the wheel hub that rotates with the wheel. The forced fluid through the hydraulic lines travel to one or more calipers where it acts upon one or two brake caliper pistons then apply force to the brake pads, which pushes them against the spinning rotor, and the friction between the pads and the rotor causes a braking torque to be generated, slowing the bicycle. The hydraulic lines leading away from the master cylinder can adjusted with regard to the amount diverted to each line so that the front and rear disc brakes can have unequal brake force applied.

Regardless of the brake system utilized, it is sometimes preferable to unequally distribute the brake force. In normal situations, the front brake handles the majority of the brake load and the weight bias is lifted from the rear tire. Thus, under these normal cycling circumstances, if equal pressures were applied to both front and back brakes, the rear wheel would end up skidding resulting in a loss of control. This invention allows for the independent adjustment of the front and rear brake lines or cables to keep the braking force consistent and maintain control.

Furthermore, it is possible that an electrical regenerative braking system may be applied to this foot actuator system. In a regenerative system, the hub incorporates an electric motor, with the axle going through the body of the motor to allow the wheel to spin. However, there is no external current applied to power the wheel and generate forward motion. Instead, activating the foot pedal causes an electric circuit to be closed and the "motor" acts as a generator thereby creating a resistive load on the wheel much like a physical brake system. In this case, the foot pedal would be actuating a variable resistor that is able to vary the impedance experienced on the wheel generator giving a linear measure of braking load.

Additionally, the normal operation of the handbrakes is not affected by the addition of the supplemental actuator. The device is designed to provide a steady but variable braking force for controlling the speed of the bike, and is not considered to be an emergency brake for stopping the bike under sudden emergency conditions.

Modern bicycles commonly use Rim brakes which are so called because braking force is applied by friction pads to the rim of the rotating wheel, thus slowing it and the bicycle. Double Pivot brake calipers and the embodiment of the Supplemental Mechanism for Actuating the Brake of a Bicycle described here shows how the actuator can be used to supplement the hand operation of such a double pivot brake caliper without affecting the normal operation of the caliper by the hand-lever on the handlebar. In dual-pivot side-pull caliper brakes, one arm pivots at the centre, like a side-pull; and the other pivots at the side, like a centre-pull.

Double pivot brake calipers are highly effective in controlling the speed of a bicycle and when operated by a Bowden cable are far more efficient in doing so that the older style single pivot brakes. Single-pivot side-pull caliper brakes consist of two curved arms that cross at a pivot above the wheel and hold the brake pads on opposite sides of the rim. These arms have extensions on one side, one attached to the cable, the other to the cable housing. When the brake lever is squeezed, the arms move together and the brake pads squeeze the rim.

Double pivot brake calipers also apply the force required for braking by squeezing together two brake pads of high friction material on either side of the rim of the wheel to be braked. The brake pads are moved towards the rim and the force is applied to the wheel rim by rotating the pads about the two pivot points of the caliper by the action of a Bowden cable.

The double pivot arrangement provides for the lever arms operating the brake pads to be of different lengths to accommodate the function of the Bowden cable. When the hand lever is operated, the end of the outer casing and the end of the inner cable of the Bowden cable at the brake caliper, move towards each other. However the motion of the inner cable is considerably greater than that of the outer jacket generally about twice as far depending on the geometry of the cable routing.

In another example embodiment, a supplemental mechanism for actuating the brake of a bicycle includes a double pivot rear caliper brake. In this example embodiment of the present invention, the existing double pivot brake caliper of the rear brake of the bicycle is operated by the normal Bowden cable from the hand lever on the handlebars, and also a second, additional Bowden cable from the supplemental mechanism. The Bowden cable from the hand lever approaches the caliper from above while the Bowden cable from the supplemental mechanism approaches the caliper from below and a "Cross-Lever" device shown in detail in the figures, is used to connect the inner cable and outer jacket respectively to the correct side of the caliper.

Following is a brief list of some example embodiments. It should be noted that these, and other embodiments disclosed herein, are not necessarily mutually exclusive of each other and may share one or more common aspects.

In one embodiment, a supplemental foot actuator that isolated from the bicycle drive-train system, for use by a user of a bicycle having a bicycle brake and a bicycle frame including a chain stay and a seat stay is described. The supplemental foot actuator includes a first pivot point mounted on the bicycle frame. The first pivot point is adjacent to the intersection of the chain stay and the seat stay of the bicycle frame such that the first pivot point is substantially within a reachable distance of the user's heel. The supplemental foot actuator includes an actuator rotatably mounted at said first pivot point. The actuator has a distal end and said distal end is widened such that the user of the bicycle can press said distal end downward. The supplemental foot actuator includes a foot lever hydraulic cylinder or cable connected to the actuator and operatably connected to the bicycle brake such that the bicycle brake decelerates the bicycle when said distal end is actuated.

In another embodiment, a supplemental knee actuator system is provided that is isolated from the bicycle drive-train system and is for use by a user of a bicycle having a bicycle brake and a bicycle frame including a top tube, a chain stay, and a seat stay. The supplemental knee actuator system includes a pivot point mounted to the top tube of the bicycle frame. The pivot point is substantially within a reachable distance of the user's knee. The supplemental knee actuator system includes an actuator rotatably mounted at the pivot point. The actuator has a distal end and the distal end is widened such that the user of the bicycle can press said distal ends inward with his or her knee. The supplemental knee actuator system includes a brake actuator (i.e. a hydraulic cylinder, electric control device or cable) that is connected to the end of the actuator. The brake actuator is further operatably connected to the bicycle brake, such that the bicycle brake decelerates the bicycle when the distal end is actuated.

In a further embodiment, a bicycle having at least one bicycle brake is described. The bicycle includes a bicycle frame including handlebars, a chain stay, and a seat stay. The bicycle also includes a primary hand actuator located on one of the handlebars. The bicycle also includes a hand lever hydraulic cylinder, electric control device or cable operably connecting said primary hand actuator with one of the bicycle brakes such that the bicycle brake decelerates the bicycle when said primary hand actuator is actuated. The bicycle also includes a first pivot point mounted on the seat stay. The first pivot point is adjacent to the intersection of the chain stay and the seat stay such that the first pivot point is substantially within a reachable distance of the user's heel. The bicycle also includes a supplemental foot actuator rotatably mounted at the first pivot point. The supplemental actuator has a distal end and said distal end is widened such that the user of the bicycle can press the distal end downward. The bicycle also includes a brake actuator (i.e. a hydraulic cylinder, electric control device or cable) operatably connecting said supplemental foot actuator with one of the bicycle brakes such that the bicycle brake decelerates the bicycle when said supplemental foot actuator is actuated.

In a still further embodiment, a bicycle having a front wheel and a rear wheel is described. The bicycle includes a bicycle frame including a chain stay, a seat stay, a front brake, and a rear brake. The front brake is located on the rim of the front wheel or at a disc on the front wheel hub and said rear brake is located on the rim of the rear wheel or at a disc on the rear wheel hub or within the hub itself. The bicycle also includes a first pivot point mounted on said seat stay. The first pivot point is adjacent to the intersection of the chain stay and the seat stay such that the first pivot point is substantially within a reachable distance of the user's heel. The bicycle also includes a supplemental foot actuator rotatably mounted at said first pivot point. The supplemental actuator has a distal end and said distal end is widened such that the user of the bicycle can press said distal end downward. The bicycle also includes a foot lever hydraulic cylinder, electric control actuator or cable operatably connecting the supplemental foot actuator with the front bicycle brake and/or the rear brake such that both of the front brake and the rear brake reduce the speed of the bicycle when the supplemental foot actuator is actuated.

In one embodiment, a method for decelerating a bicycle is described. The bicycle has at least a bicycle brake and a bicycle frame including a top tube, a seat stay, and a chain stay. The bicycle also includes locating a user's hand with respect to a primary hand brake system. The primary hand actuator includes a primary hand actuator and a hand lever hydraulic cylinder, electric control actuator or cable, operatably connecting said primary hand actuator with one of the bicycle brakes such that the bicycle brake decelerates the bicycle when said primary hand actuator is actuated. The method may include locating a user's foot with respect to a supplemental foot brake system isolated from the bicycle drive-train system. The supplemental foot brake system includes a first pivot point mounted on said seat stay. The first pivot point is adjacent to the intersection of the chain stay and the seat stay such that the first pivot point is substantially within a reachable distance of the user's heel. The supplemental foot brake system includes a supplemental foot actuator rotatably mounted at the first pivot point. The supplemental foot actuator has a distal end and the distal end is widened such that the user of the bicycle can press the distal end downward. The supplemental foot brake system includes a brake actuator (i.e. a hydraulic cylinder or cable) operatably connecting the supplemental foot actuator with one of the bicycle brakes such that the bicycle brake decelerates the bicycle when the supplemental foot actuator is actuated. In addition or alternatively, the method may include locating a user's knee with respect to a supplemental knee brake system isolated from the bicycle drive-train system. The supplemental knee brake system including a pivot point mounted to the top tube of the bicycle frame. The pivot point is substantially within a reachable distance of the user's knee, a left actuator rotatably mounted at said pivot point, and a right actuator rotatably mounted at the pivot point. The left actuator and the right actuator each has a distal end and the distal ends are widened such that the user of the bicycle can press the distal ends inward with his or her knee. The supplemental knee brake system includes a knee lever hydraulic cylinder or cable connected to the ends of the left actuator and the right actuator. The knee lever is further operatably connected to the bicycle brake or acts directly on the exposed cable of the existing rear brake such that the bicycle brake decelerates the bicycle when either one of said distal ends is actuated. The method includes actuating the primary hand brake system and may include one or both of actuating the supplemental foot brake system and actuating the supplemental knee brake system.

BRIEF DESCRIPTION OF THE SEVERAL
VIEWS OF THE DRAWINGS

To further clarify the aspects of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EMBODIMENTS
OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Embodiments of the present invention would be of great value in any circumstance wherein a bicycle rider experiences difficulty controlling the speed of the bicycle by use of the hands alone. For example, at least one embodiment of the present invention would be of immediate benefit to cyclists who, because of disabilities do not have the full use of, or do not have sufficient strength in both hands to safely operate the normal hand operated brakes on a bicycle. For example, one-handed cyclists could operate one brake with their good hand and use the supplemental actuator to operate the other brake.

Furthermore all but the most experienced and strongest cyclists, on occasion, will experience difficulty during a long or steep descent that requires the constant application of the brakes to control the speed of the bicycle. In this situation, the hands, arms or shoulders can become tired or can become cramped which, besides being very uncomfortable and painful, will seriously affect control of the bicycle. Riders suffering from arthritis in the hands or arms will be particularly affected.

Thus, the present invention includes at least one embodiment of a supplemental actuator. Operating the brake by use of the supplemental actuator will relieve this condition and result in greater braking control and safer operation of the bicycle with greatly diminished stress on the hands.

Furthermore, some modern racing bicycles are designed to take advantage of the benefits of Aerodynamic handlebar systems. Typically these handlebar systems provide for two riding positions. In the aerodynamic "tuck" position the rider does not normally have access to the hand brakes and must move out of the aerodynamic tuck position into a more upright non-aerodynamic position in order to gain access to the brake levers. This movement out of the tuck position is most undesirable under racing conditions as is tends to be disruptive to the rider's rhythm, slowing the rider and after each such movement the rider has to "settle-in" to the tuck position again. Thus, under such circumstances the supplemental (or an independent) mechanism for operating the brake would enable the rider to control the speed of the bike without leaving the tuck position. In an embodiment of the invention adapted for this application the actuator is very simple, streamlined and lightweight and acts directly on a rear brake caliper.

The operations are unlike that of coaster brakes also known as a back pedal brake or foot brake, which relies on a type of drum brake integrated into hubs with an internal freewheel. However, in the freewheel of a coaster brake, when the pedal is back pedaled, the brake engages after a fraction of a revolution. When such a hub is pedaled forwards, the sprocket drives a screw which forces a clutch to move along the axle, driving the hub shell or gear assembly. When pedaling is reversed, the screw drives the clutch in the opposite direction, forcing it either between two brake shoes and pressing them against the brake mantle (which is a steel liner within the hub shell), or into a split collar and expanding it against the mantle. Hence, the coaster brake is not compatible with modern multiple shift gearing hubs with freewheels that allow clutch-less and free reverse rotation during the back pedaling motion.

Figure 1:
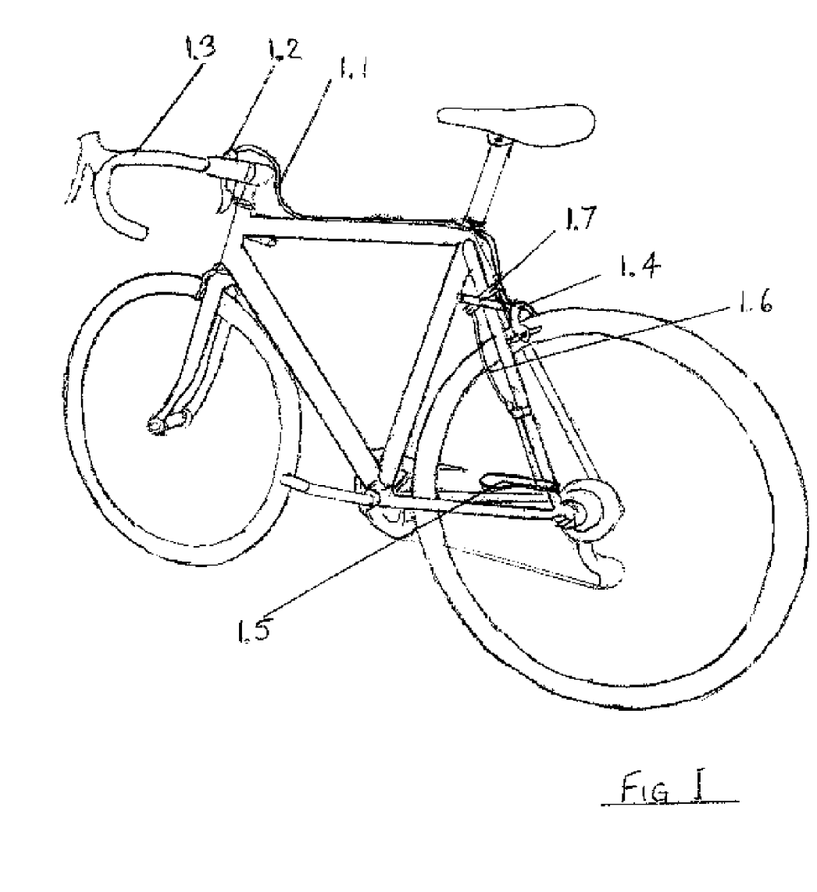
FIG. 1 illustrates a first example embodiment of rear-side view of a multi-speed type road bicycle with a normal Bowden cable and a supplemental brake actuator connected to the caliper via a second Bowden cable and a 'cross-lever' mechanism.

FIG. 1 illustrates a first example embodiment of a rear-side view of a multi-speed type road bicycle with a normal Bowden cable 1.1 running from the hand brake lever 1.2 on the handlebar 1.3 to the rear brake caliper 1.4 and a supplemental brake actuator 1.5 connected to the caliper 1.4 via a second Bowden cable 1.6 and a 'cross-lever' mechanism 1.7.

Figure 2:
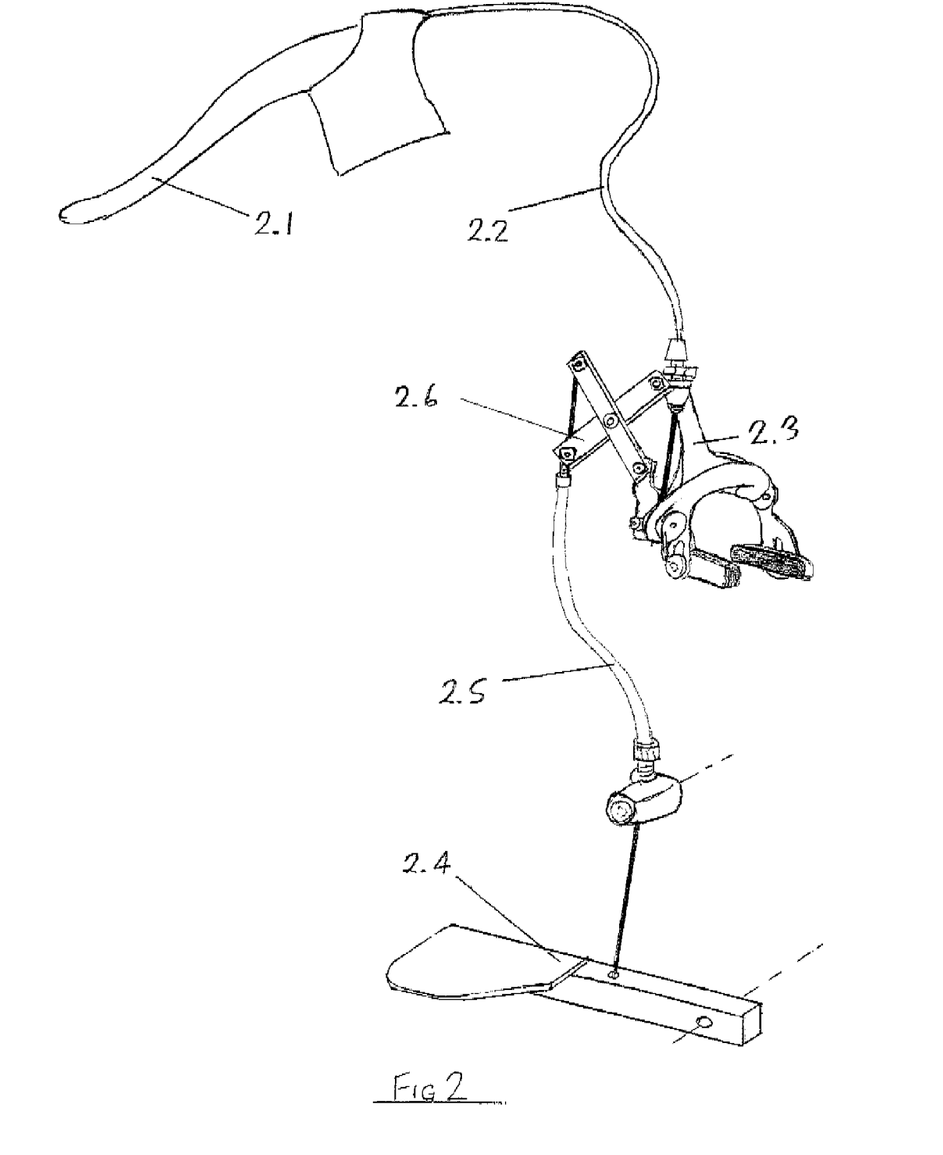
FIG. 2 illustrates a second example embodiment of the invention in combination with a double pivot rear brake caliper mechanism.

In this particular example, the supplemental brake actuator 1.5 is attached to the rear left seat stay of the bicycle frame. In other embodiments, the supplemental brake actuator 1.5 can be attached to the left chain stay or in the case of knee operation to the top tube of the bicycle frame. Other locations are also contemplated. In the case of a tandem, the lever or levers would be situated such that they can be operated either by the "Captain," the rider in the front position or the "Stoker," the rider in the rear position or by both simultaneously. As in the case of a regular bicycle, on a recumbent bicycle the actuating lever of the supplemental brake actuator 1.5 would be mounted such that pressure can be applied to it by the riders heel, however in this case there is an even greater advantage in that the rider's feet, and thus the lever also are in the direct view of the rider without looking down FIG. 2 illustrates a second example embodiment of the invention in combination with a double pivot rear brake caliper mechanism 2.3. The existing hand brake lever 2.1 is connected via an existing Bowden cable 2.2 to an existing double pivot rear brake caliper 2.3. A supplemental actuator 2.4 is connected to the rear brake caliper via a Bowden cable 2.5 and a cross-lever mechanism 2.6.

In another embodiment, the cable 2.5 can be directly tied into the cable 2.2 without the use of the cross lever 2.6 mechanism. In this manner, the foot pedal brake cable can also be directly routed to the rear cable holder nut assembly. The attachment point of the cable to the foot pedal permits varying degree of cable pull to be accomplished. Mounting the cable nearer to the pivot point, causes less cable pull, whereas mounting the cable closer to the end, allows more cable pull and greater braking force. The foot actuator could thereby have a series of holes for placing the cable end and allow adjustment of cable pull (not shown).

Figure 3:
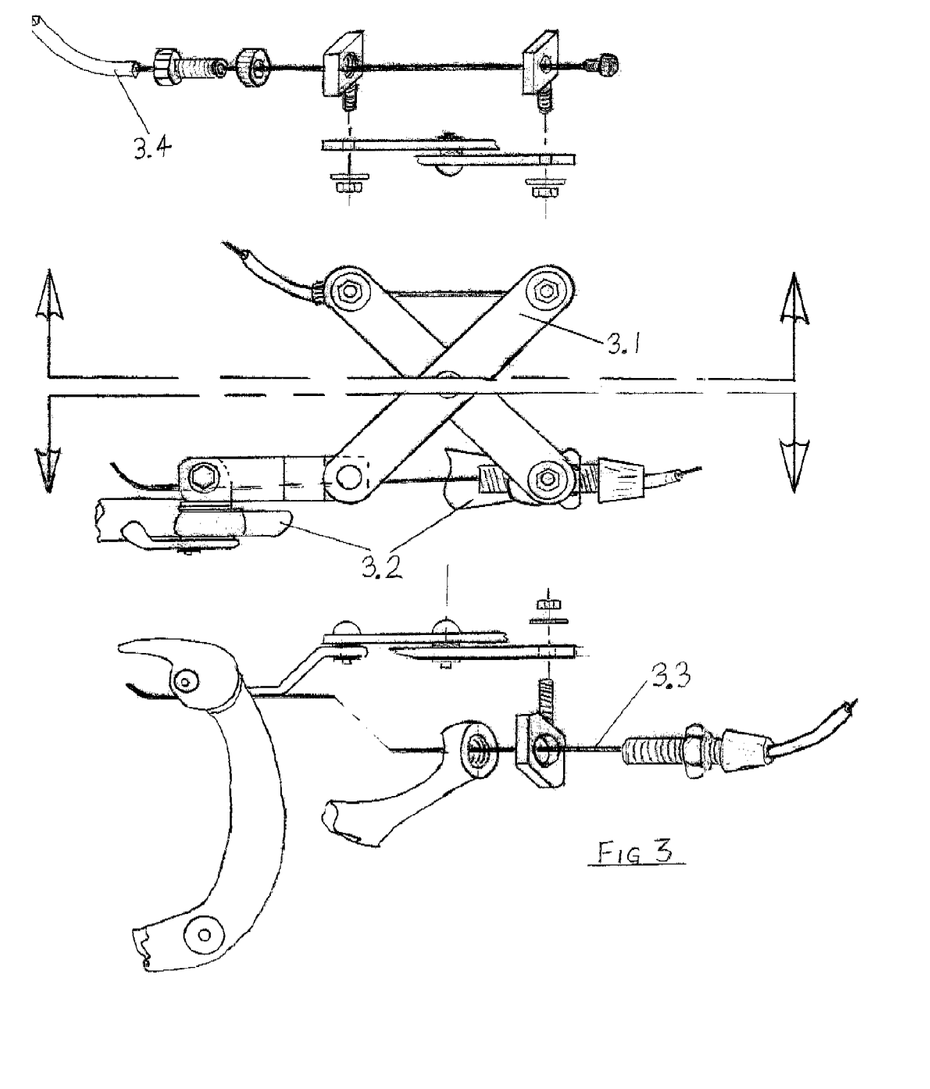
FIG. 3 illustrates details of the cross-lever mounted to the double pivot brake caliper of the example embodiment shown in FIG. 2.

Besides, the X or Cross-member mechanism for double pivot brake calipers as shown in 1.7, there are other leverage systems available to transfer the actuation from the foot system to the mounted brake system. For example a single pivot brake caliper would not need the cross mechanism, the Bowden cable would attach directly to the brake caliper. Also in the case of hydraulic brake systems the master cylinder could be mounted so that the end of the foot or knee actuated lever presses directly on the piston of the master cylinder, forcing hydraulic fluid through the lines to actuate the brakes when the lever is moved, and in the example of a rear wheel disc brake the actuating lever could apply the braking force to the brake pads via a direct mechanical linkage FIG. 3 illustrates details of the cross-lever 3.1 of the example embodiment shown in FIG. 2. The cross-lever 3.1 is mounted to the double pivot brake caliper 3.2 with the existing cable 3.3 from the handlebar mounted lever and the Bowden cable 3.4 from the supplemental braking mechanism. The mechanical efficiency of the double pivot brake caliper is much great than that of the older style single pivot brakes since the lever arm in the caliper attached to each brake pad is adjusted to match the motion of either the inner wire or outer jacket of the Bowden cable. Thus, to retain this added mechanical efficiency the Bowden cable from the supplemental mechanism has to pull on the brake pad lever arms in the same way as the original cable from the hand operated levers (i.e. the inner wire on the same brake pad lever and the outer jacket on the same brake pad lever). This is accomplished by the cross-lever mechanism 3.1.

Figure 4:
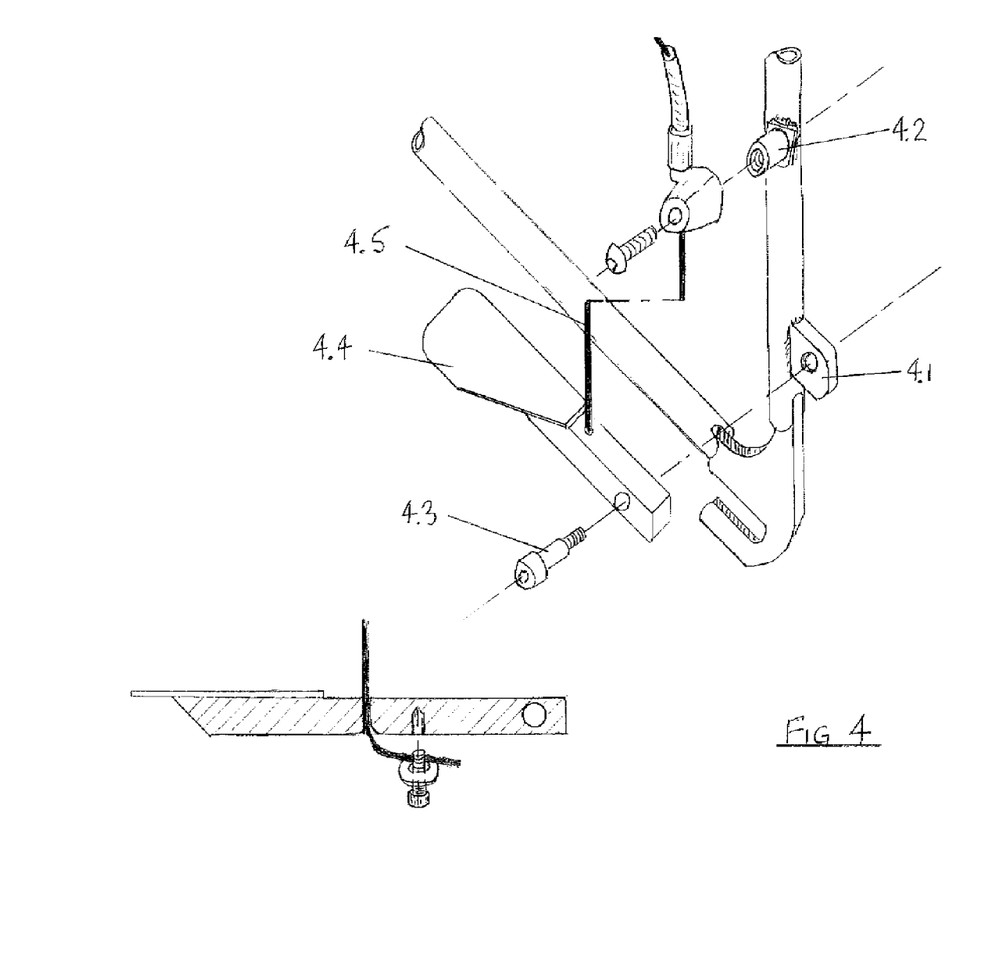
FIG. 4 illustrates an example embodiment of a supplemental actuator.
Figure 5:
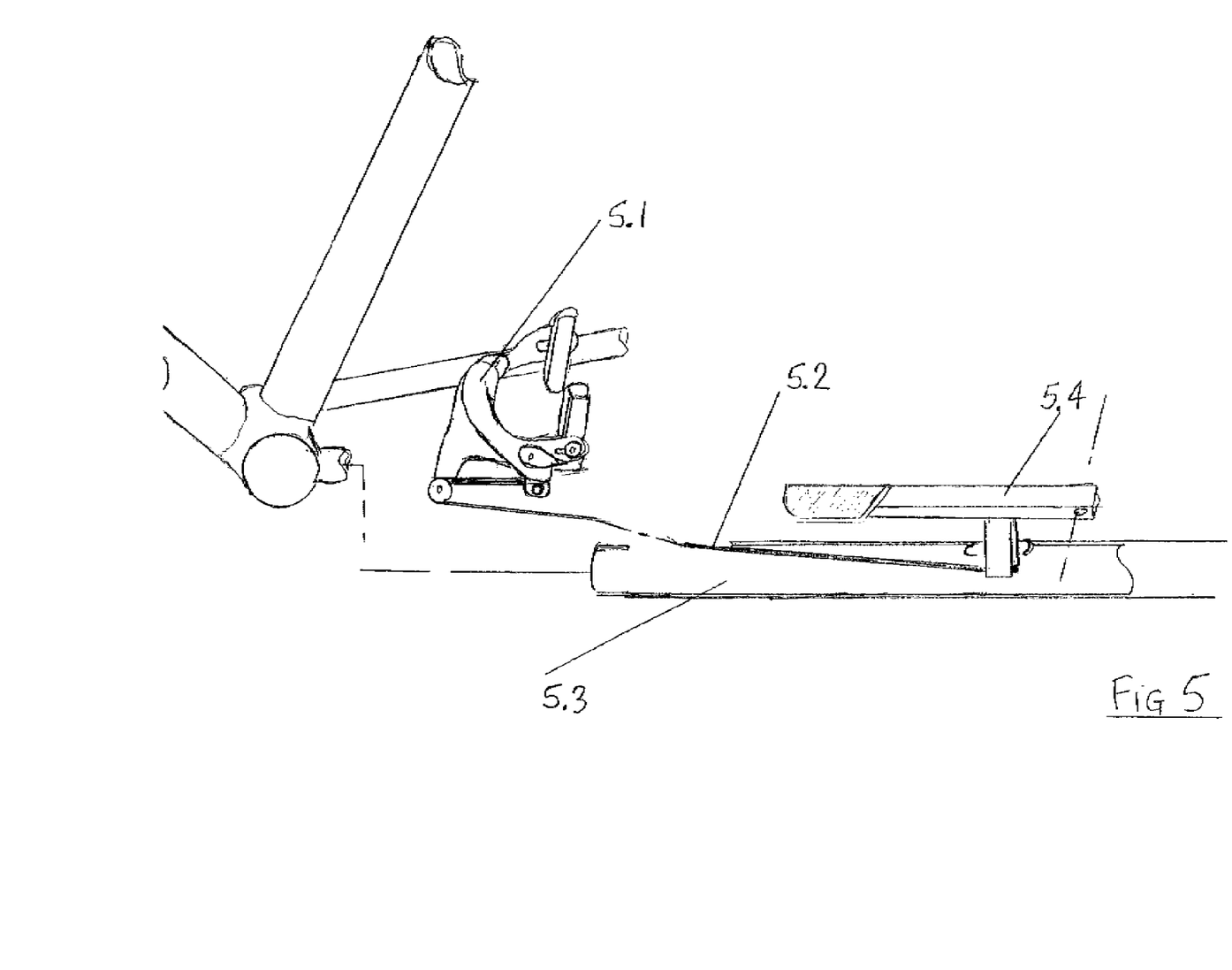
FIG. 5 illustrates an example embodiment of a supplemental actuator adapted for a bicycle with aerodynamic handlebars (not shown)

FIG. 4 illustrates an example embodiment of a supplemental actuator. The supplemental actuator includes a pivot mounting point 4.1 on the seat stay. The cable stop 4.2 is also on the seat stay. The supplemental actuator includes a pivot shaft 4.3 around which the actuator rotates. The actuator includes a widened end 4.4 to accommodate foot actuation. The supplemental actuator includes a Bowden cable 4.5 which connects to the brake via, for example, a cross-lever. The pivot mounting point 4.1 must be securely mounted. In other embodiments, it can be attached to any part of the bicycle frame that allows suitable geometry for the actuation of the lever by the rider's leg, foot or knee. It must be attached to the frame securely by, for example, welding, brazing, gluing or riveting FIG. 5 illustrates an example embodiment of a supplemental actuator adapted for a bicycle with aerodynamic handlebars (not shown). In this example, the brake caliper 5.1 is mounted near the bottom bracket and a single cable 5.2 runs inside the chain-stay 5.3 from a supplemental actuator 5.4 to the brake caliper. The configuration of mounting the brake caliper near the bottom bracket is now normal for highly aerodynamic Time Trial type bicycles and this lends itself ideally to the actuation of the brake caliper by the supplemental mechanism. In one embodiment, the supplemental brake actuating lever 5.4 could be pivoted about an axis mounted directly on the chain stay as shown, with the actuating cable hidden inside the chain stay for greatest aerodynamic efficiency, a further embodiment could utilize a hydraulic brake caliper with a hydraulic brake line and master cylinder hidden inside the chain stay and actuated directly by the supplemental mechanism.

Figure 6:
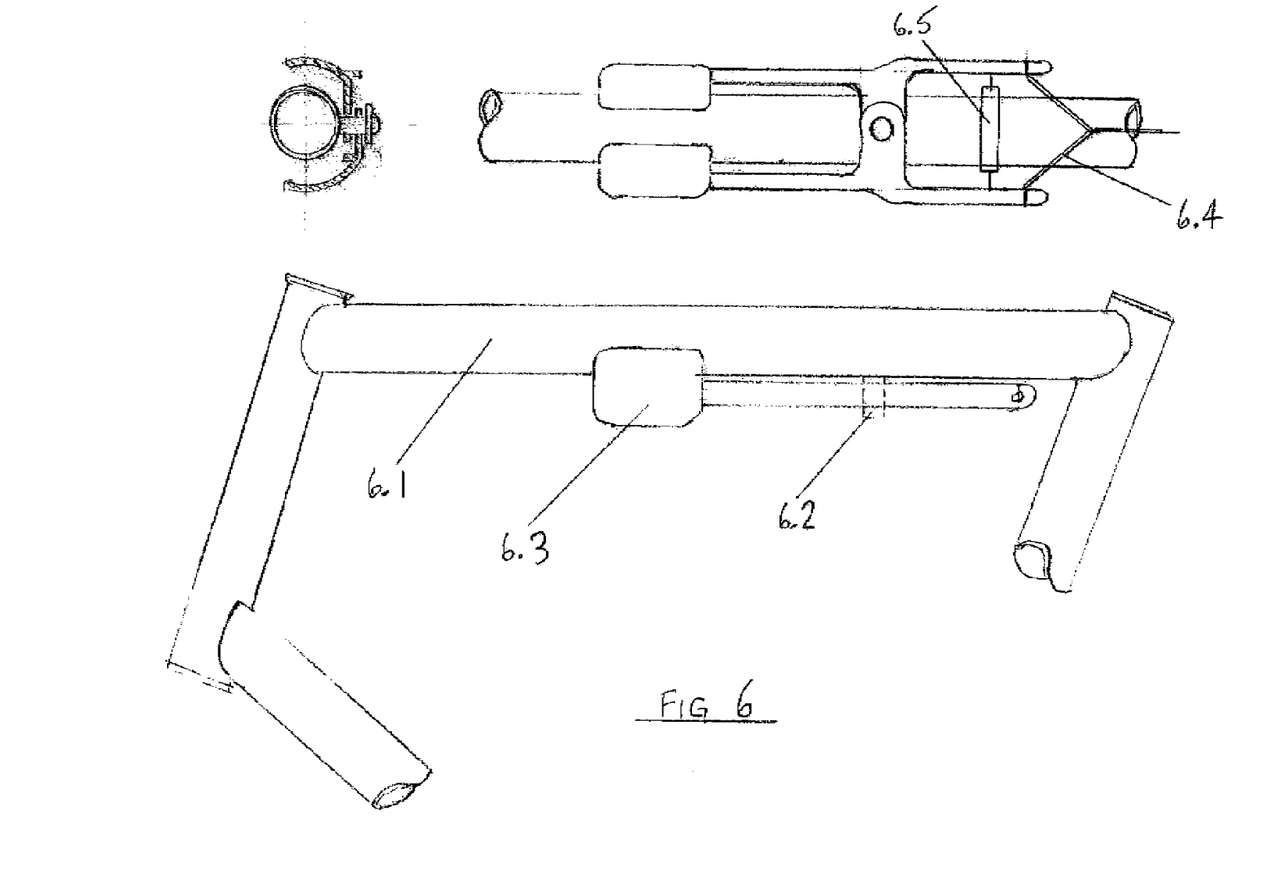
FIG. 6 illustrates an example embodiment of a supplemental actuator which can be operated by the riders knees.

FIG. 6 illustrates an example embodiment of a supplemental actuator which can be operated by the riders knees, either by pressing the left knee inwards or by pressing the right knee inwards or by squeezing the knees inwards towards one another. The top tube 6.1 of the bicycle has a pivot 6.2 mounted to it. The supplemental actuator 6.3 is mounted to the pivot and rotates around it when pressed by the knee. A device 6.4 attached at the rear, actuates the bicycle brake or brakes by means of a Bowden cable. In a further embodiment of the device, 6.5 represents either an hydraulic master cylinder which will provide hydraulic fluid under pressure to actuate hydraulic braking mechanisms, or alternatively an electrical control device which will control the flow of electricity from a power source to actuate electrical braking mechanisms. Professional racing cyclists can be seen, when descending very fast, gripping the top tube of the bicycle between their knees. This provides greater stability to the bicycle, particularly when descending on a rough road and additionally serves to make the rider's body more aerodynamic so that greater speeds can be reached. By providing supplemental brake levers which can be actuated by the rider's knees, much of the pressure required by the hands and fingers on long descents can be relieved.

Figure 7:
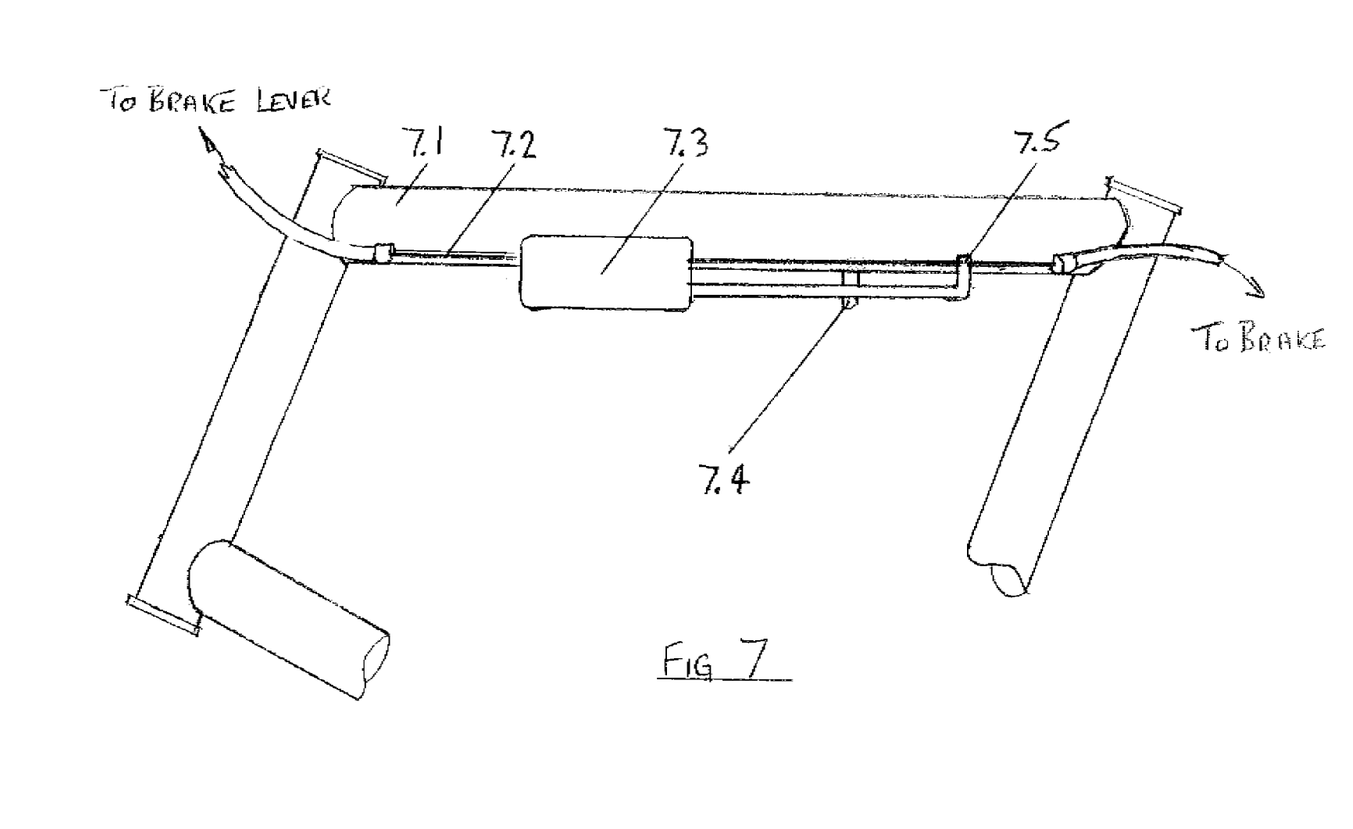
FIG. 7 illustrates an example embodiment of a bicycle having an exposed inner cable for the rear brake running parallel to and close to the top tube.
Figure 8:
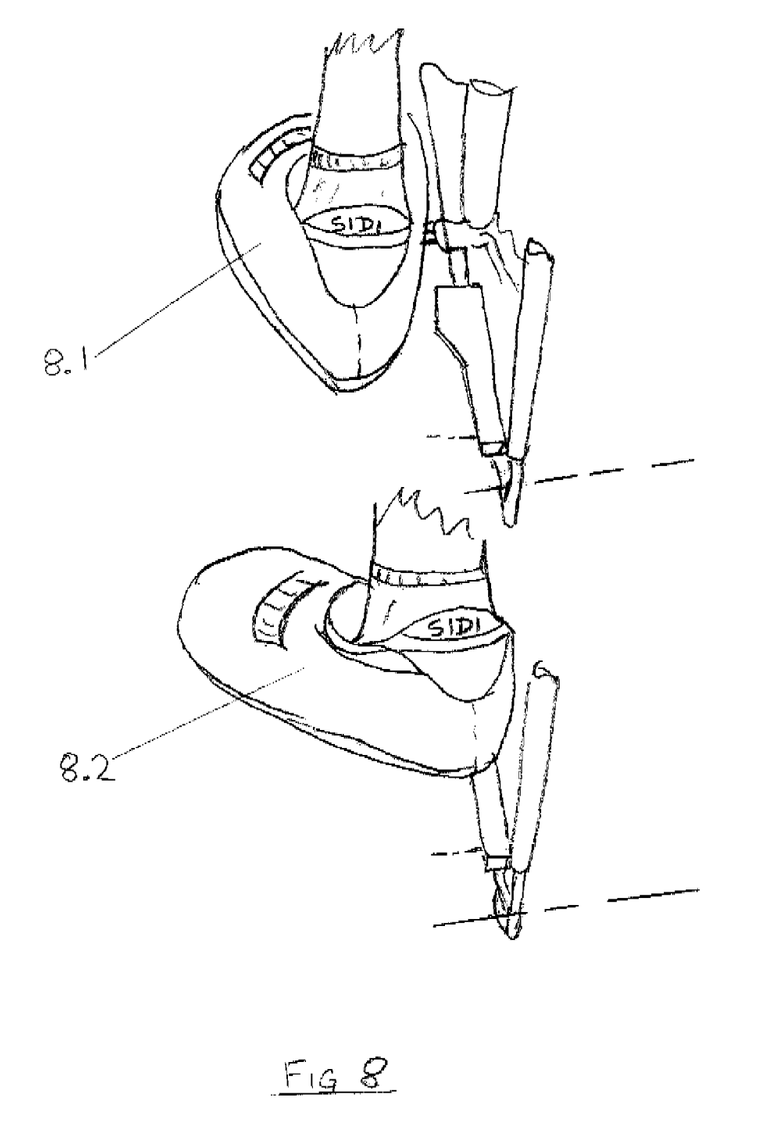
FIG. 8 illustrates a rear view of the cyclists left foot and shows example rotation of a heel required to operate an example embodiment of a supplemental actuator.

FIG. 7 illustrates an example embodiment of a bicycle having an exposed inner cable for a rear brake 7.2 running parallel to and close to a top tube 7.1 of a bicycle. The supplemental actuator 7.3 is mounted to a pivot point 7.4 on the top tube. The exposed inner brake cable is passed through an eye at the rear of the actuator such that when the supplemental actuator is pressed by the rider's knee and pivots, the eye moves the inner cable and thus operates the brake. This is similar in principle to the supplemental actuator shown in FIG. 6. In the embodiment shown, it is very simple to implement needing only a single pivot point to be mounted to the bicycle frame, however it operates only on the rear brake through the existing cable running to the caliper from the hand brake lever on the handlebars FIG. 8 illustrates a rear view of the cyclists left foot and shows example rotation of a heel required to operate an example embodiment of a supplemental actuator. During the normal pedaling stroke, the foot 8.1 is in its normal pedaling position and when in the rearmost portion of the pedaling arc passes close to the supplemental mechanism but does not touch it. When the rider wishes to actuate the supplemental braking mechanism, the pedals are rotated so that the cranks are approximately horizontal with the left foot in the rearmost position, the foot is then rotated slightly on the pedal 8.2 to move the heel inwards towards the rear wheel of the bicycle so that the heel is above the supplemental actuating lever. The heel is then pressed down to make contact with the lever and move it downwards to operate the supplemental braking mechanism. By varying the pressure applied to the lever by the riders heel, the braking force can be controlled.

Figure 9:
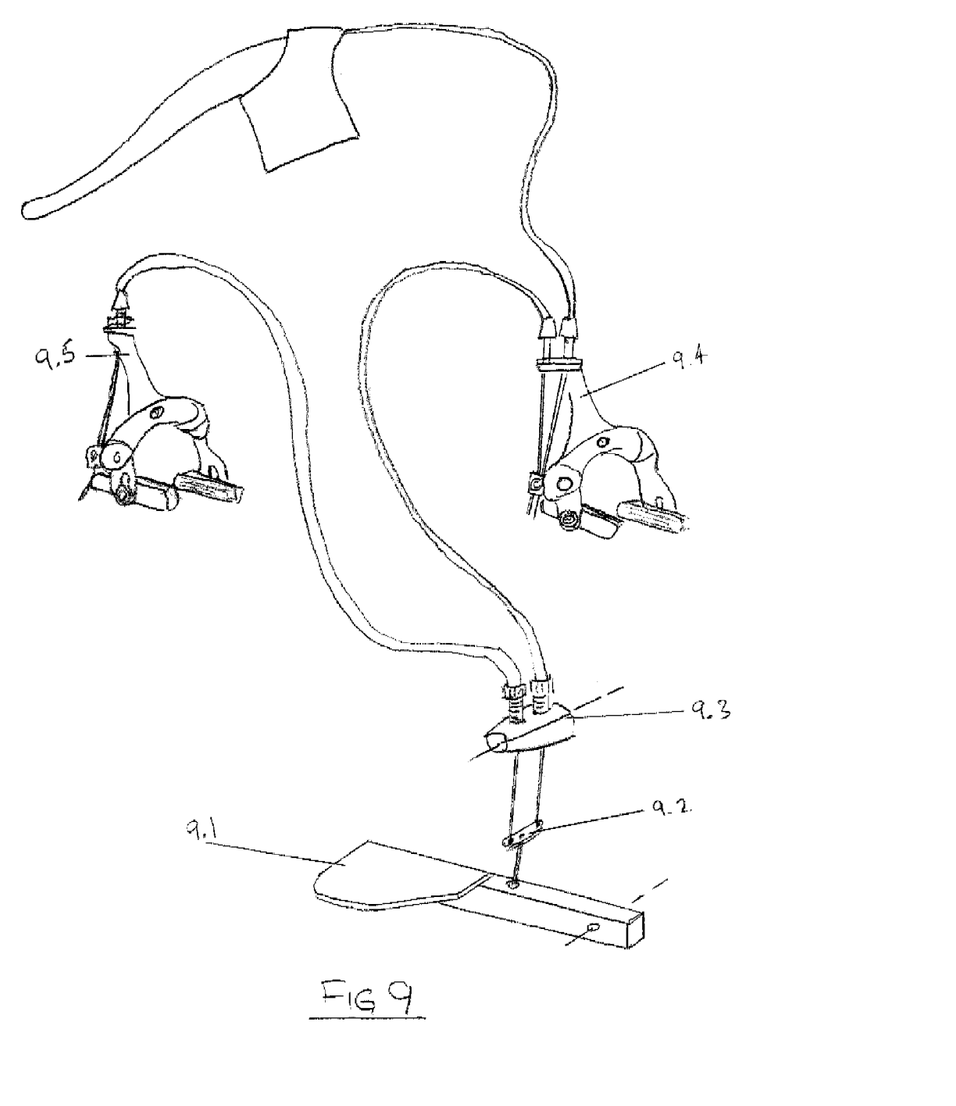
FIG. 9 illustrates an example embodiment of a supplemental actuator to operate both the front and rear brakes of a bicycle.

FIG. 9 illustrates an example embodiment of a supplemental actuator to operate both the front and rear brakes of a bicycle, in this case showing single pivot brakes, although it would apply also to other brake mechanisms. The supplemental actuator includes an actuator lever 9.1, a device 9.2 to connect the front and rear brake actuating cables together and to balance the degree of application between the front and rear brakes, a stop 9.3 for the double cable arrangement, one of the brake calipers 9.4, and another brake caliper 9.5. FIG. 9 illustrates how the caliper can be operated by the usual hand lever as well as the supplemental mechanism. In other embodiments, the stop 9.3 could be replaced by a master cylinder with its piston actuated by the supplemental lever and the Bowden cables would be replaced by hydraulic lines operating hydraulic calipers 9.4 and 9.5 either on the wheel rims or on the discs of disc brakes. Or alternatively the stop 9.3 could be replaced with an electrical controller to apply and control an electric current to electric rim or disc brake mechanisms.

Figure 10:
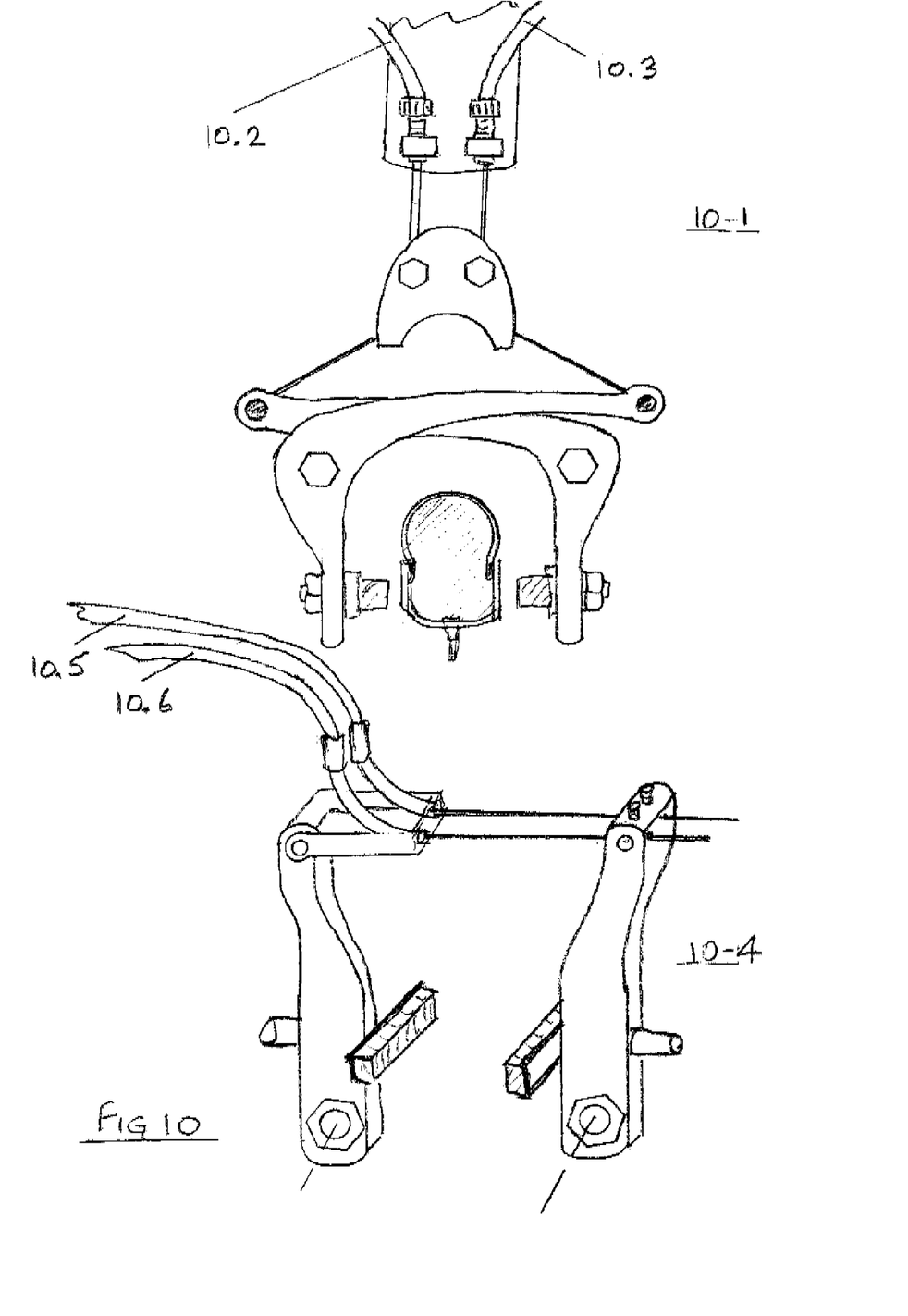
FIG. 10 illustrates another example embodiment of a supplemental actuator.

FIG. 10 illustrates another example embodiment of a supplemental actuator that may use cantilever and/or V type brakes. Mountain bikes, hybrid bikes tandems, recumbents and other multi-use bikes frequently use center pull, cantilever or V style brakes, since in general these brake types allow for more flexibility in the selection of, and permit the use of, wider rims and tires than are commonly used on road bikes. All of the embodiments of the supplemental braking system described are equally applicable to these and other styles of bicycle brakes. For example, FIG. 10 shows how cantilever brakes 10.1 can be operated by the supplemental mechanism without interfering with the normal operation of the brakes by the hand lever, where the cable 10.2 operated by the original hand lever and the cable 10.3 operated by the supplemental mechanism may both connect to the cantilever brake 10.1.

Similarly V Type brakes 10.4 can be operated by the original hand lever via cable 10.5 and also by the supplemental mechanism via cable 10.6.

Figure 11:
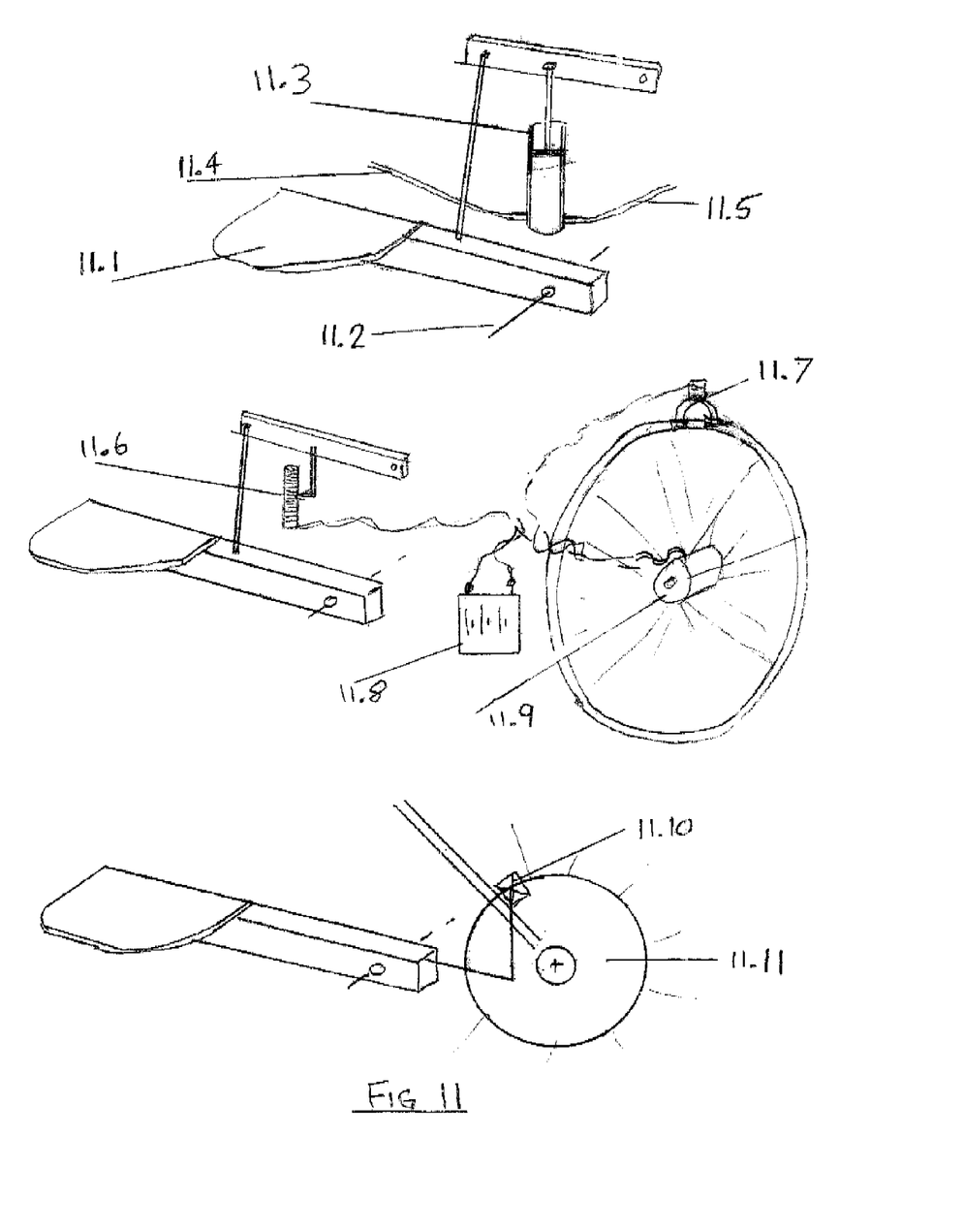
FIG. 11 illustrates a further example embodiment of a supplemental actuator.

FIG. 11 illustrates a further example embodiment of a supplemental actuator that may use hydraulic brakes, electric brakes, a direct linkage to a rear disk brake, other braking systems, or combinations thereof. When the lever 11.1 of the supplemental mechanism is depressed it rotates about the pivot point 11.2 to actuate an hydraulic cylinder 11.3 which will provide hydraulic fluid under pressure to operate either the front or rear or both, hydraulic braking mechanisms of hydraulic rim, disc or hub brakes.

Similarly the lever of the supplemental mechanism can be used to operate an electronic control device 11.6 which can be utilized to control the flow of electricity from an electrical source 11.8 to apply electrically operated rim 11.7, disc or hub brakes 11.9 and in the case of disc and hub electric brakes to also control the regenerative effect of braking In a further embodiment of the supplemental mechanism 11.10 shows a brake caliper on a rear disc brake 11.11 with the caliper operated by a direct mechanical linkage from the lever of the supplemental mechanism It should be noted that, while the invention has been described in connection with the above described embodiments, it is not intended to limit the scope of the invention to the particular forms set forth, but on the contrary, it is intended to cover such alternatives, modifications, and equivalents as may be included within the scope of the invention. Accordingly, the scope of the present invention fully encompasses other embodiments that may become obvious to those skilled in the art and the scope of the present invention is limited only by the appended claims.

What is claimed is:
1. A method for decelerating a bicycle having at least an existing rear bicycle brake having an exposed cable and a bicycle frame including a top tube, a seat stay, and a chain stay, comprising:
  locating a user's hand with respect to a primary hand brake system, the primary hand brake system comprising:
    a primary hand actuator; and
    a hand lever hydraulic cylinder, electric control actuator or cable, operatably connecting said primary hand actuator with one of the bicycle brakes such that the bicycle brake decelerates the bicycle when said primary hand actuator is actuated;
locating a user's foot with respect to a supplemental foot brake system isolated from a bicycle drive-train system, the supplemental foot brake system comprising:
  a first pivot point mounted on said seat stay, wherein said first pivot point is adjacent to the intersection of said chain stay and said seat stay such that the first pivot point is substantially within a reachable distance of a user's heel;
  a supplemental foot actuator rotatably mounted at said first pivot point, wherein said supplemental foot actuator has a distal end and said distal end is widened such that the user of the bicycle can press said distal end downward; and
  a foot lever hydraulic cylinder or cable operably connecting said supplemental foot actuator with one of the bicycle brakes such that the bicycle brake decelerates the bicycle when said supplemental foot actuator is actuated;
locating a user's knee with respect to a supplemental knee brake system isolated from the bicycle drive-train system, the supplemental knee brake system comprising:
  a second pivot point mounted to the top tube of the bicycle frame, wherein said second pivot point is substantially within a reachable distance of the user's knee;
  a left actuator rotatably mounted at said second pivot point;
  a right actuator rotatably mounted at said second pivot point, wherein said left actuator and said right actuator each has an actuator distal end and said actuator distal ends are widened such that the user of the bicycle can press said actuator distal ends inward; and
  a knee lever hydraulic cylinder or cable connected to the actuator distal ends of said left actuator and said right actuator, wherein said knee lever hydraulic cylinder or cable is further operably connected to the bicycle brake or acts directly on the exposed cable of the existing rear brake such that the bicycle brake decelerates the bicycle when either one of said actuator distal ends is actuated;
actuating the primary hand brake system;
actuating the supplemental foot brake system; and
actuating the supplemental knee brake system.

* * * * *